(12) United States Patent
Su et al.

(10) Patent No.: US 11,663,249 B2
(45) Date of Patent: May 30, 2023

(54) VISUAL QUESTION ANSWERING USING VISUAL KNOWLEDGE BASES

(71) Applicant: INTEL CORPORATION, Santa Clara, CA (US)

(72) Inventors: Zhou Su, Beijing (CN); Jianguo Li, Beijing (CN); Yinpeng Dong, Santa Clara, CA (US); Yurong Chen, Beijing (CN)

(73) Assignee: Intel Corporation, Santa Clara, CA (US)

(*) Notice: Subject to any disclaimer, the term of this patent is extended or adjusted under 35 U.S.C. 154(b) by 452 days.

(21) Appl. No.: 16/650,853

(22) PCT Filed: Jan. 30, 2018

(86) PCT No.: PCT/CN2018/074548
§ 371 (c)(1),
(2) Date: Mar. 25, 2020

(87) PCT Pub. No.: WO2019/148315
PCT Pub. Date: Aug. 8, 2019

(65) Prior Publication Data
US 2021/0109956 A1    Apr. 15, 2021

(51) Int. Cl.
*G06F 16/33* (2019.01)
*G06F 16/332* (2019.01)
(Continued)

(52) U.S. Cl.
CPC ......... *G06F 16/3329* (2019.01); *G06N 3/045* (2023.01); *G06N 3/049* (2013.01); *G06N 5/025* (2013.01)

(58) Field of Classification Search
USPC ........................................ 707/771
See application file for complete search history.

(56) References Cited

U.S. PATENT DOCUMENTS 9,965,705 B2    5/2018   Chen et al.
10,198,671 B1*  2/2019   Yang ................... G06T 7/11
(Continued)

FOREIGN PATENT DOCUMENTS

CN    106649542 A    5/2017
CN    106951473 A    7/2017

OTHER PUBLICATIONS

Kim et al., "Hadamard Product for Low-Rank Bilinear Pooling", Oct. 2016, ICLR 2017 (Year: 2016).*
(Continued)

*Primary Examiner* — Hosain T Alam
*Assistant Examiner* — Robert F May
(74) *Attorney, Agent, or Firm* — Hanley, Flight and Zimmerman, LLC (57) ABSTRACT

An example apparatus for visual question answering includes a receiver to receive an input image and a question. The apparatus also includes an encoder to encode the input image and the question into a query representation including visual attention features. The apparatus includes a knowledge spotter to retrieve a knowledge entry from a visual knowledge base pre-built on a set of question-answer pairs. The apparatus further includes a joint embedder to jointly embed the visual attention features and the knowledge entry to generate visual-knowledge features. The apparatus also further includes an answer generator to generate an answer based on the query representation and the visual-knowledge features.

30 Claims, 5 Drawing Sheets

(51) Int. Cl.
    *G06N 3/049*     (2023.01)
    *G06N 5/025*     (2023.01)
    *G06N 3/045*     (2023.01)

(56) References Cited

U.S. PATENT DOCUMENTS

| | | | |
|---|---|---|---|
| 2016/0306846 A1 | 10/2016 | Adams, Jr. et al. | |
| 2016/0328648 A1 | 11/2016 | Jalleh et al. | |
| 2017/0200077 A1* | 7/2017 | Weston | G06N 3/042 |
| 2017/0308531 A1* | 10/2017 | Ma | G06F 16/2471 |
| 2019/0130206 A1* | 5/2019 | Trott | G06N 5/04 |
| 2019/0205706 A1* | 7/2019 | Govindaraj | G06F 18/24147 |

OTHER PUBLICATIONS

Yu et al. "Multi-modal Factorized Bilinear Pooling with Co-Attention Learning for Visual Question Answering", Oct. 2017, 2017 IEEE International Conference on Computer Vision (ICCV). (Year: 2017).*
International Search Report for Related PCT Application PCT/CN2018/074548 dated Jul. 13, 2018, 2 pages.
Agrawal et al.; "VQA: Visual Question Answering" arXiv:1505.00468v7 [cs.CL] Oct. 27, 2016, International Conference on Computer Vision (ICCV) 2015.
Shih et al.; "Where to look: Focus Regions for Visual Question Answering" arXiv.org > cs> arXiv:1511.07394, (Submitted on Nov. 23, 2015 (v1), last revised Jan. 10, 2016 (this version, v2)).
Xu et al.; "(Submitted on Jun. 6, 2016 (v1), last revised Sep. 24, 2016 (this version, v3))r: Exploring Question-Guided Spatial Attention for Visual Question Answering" arXiv.org > cs > arXiv:1511.05234, (Submitted on Nov. 17, 2015 (v1), last revised Mar. 19, 2016 (this version, v2)).
Yin et al.; "ABCNN: Attention-Based Convolutional Neural Network for Modeling Sentence Pairs", arXiv.org > cs > arXiv:1512.05193, (Submitted on Dec. 16, 2015 (v1), last revised Jun. 25, 2018 (this version, v4)).
Fukui et al.; "Multimodal Compact Bilinear Pooling for Visual Question Answering and Visual Grounding", arXiv.org > cs > arXiv:1606.01847, (Submitted on Jun. 6, 2016 (v1), last revised Sep. 24, 2016 (this version, v3)).
Kim et al,; "Hadamard Product for Low-rank Bilinear Pooling", arXiv.org > cs > arXiv:1610.04325, (Submitted on Oct. 14, 2016 (v1), last revised Mar. 26, 2017 (this version, v4)).
Wang et al.; "Explicit Knowledge-based Reasoning for Visual Question Answering", arXiv.org > cs > arXiv:1511.02570, (Submitted on Nov. 9, 2015 (v1), last revised Nov. 12, 2015 (this version, v2)).
Wu et al.; "Ask Me Anything: Free-form Visual Question Answering Based on Knowledge from External Sources", arXiv.org > cs > arXiv:1511.06973, (Submitted on Nov. 22, 2015 (v1), last revised Apr. 14, 2016 (this version, v2)).
Weston, et al.;"Memory Networks", arXiv.org > cs > arXiv:1410.3916, (Submitted on Oct. 15, 2014 (v1), last revised Nov. 29, 2015 (this version, v11)).
Miller et al.; "Key-Value Memory Networks for Directly Reading Documents", arXiv.org > cs > arXiv:1606.03126, (Submitted on Jun. 9, 2016 (v1), last revised Oct. 10, 2016 (this version, v2)).
Bordes et al.; "Question Answering with Subgraph Embeddings", arXiv.org > cs > arXiv: 1406.3676, (Submitted on Jun. 14, 2014 (v1), last revised Sep. 4, 2014 (this version, v3)).
Lin et al.; "Microsoft COCO: Common Objects in Context", arXiv.org > cs > arXiv:1405.0312, (Submitted on May 1, 2014 (v1), last revised Feb. 21, 2015 (this version, v3)).
Krishna et al.; "Visual Genome: Connecting Language and Vision Using Crowdsourced Dense Image Annotations" International Journal of Computer Vision vol. 123, pp. 32-73(2017).
Bordes et al.; "Translating Embeddings for Modeling Multi-relational Data" NIPS'13: Proceedings of the 26th International Conference on Neural Information Processing Systems—vol. 2*Dec. 2013 *pp. 2787-2795.
Engineering AT META, "Visual Question and Answering Demo," Facebook, Nov. 3, 2015, retrieved from the Internet from [https://www.facebook.com/Engineering/videos/10153621574817200/] on Jun. 13, 2022, 3 pages.
International Searching Authority, "Written Opinion," dated Jul. 13, 2018 in connection with International Patent Application No. PCT/CN2018/074548, 3 pages.

* cited by examiner

VISUAL QUESTION ANSWERING USING VISUAL KNOWLEDGE BASES

CROSS REFERENCE TO RELATED APPLICATIONS

Pursuant to 35 U.S.C. § 371, this application is the United States National Stage Application of International Patent Application No. PCT/CN2018/074548, filed on Jan. 30, 2018, the contents of which are incorporated by reference as if set forth in their entirety herein.

BACKGROUND

Visual question answering (VQA) aims to help computers automatically answer natural language question about an image. For example, an answer to a question may be in the form of a yes or no answer, a multi-choice answer, a number answer, a word or phrase, etc.

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

As discussed above, visual question answering (VQA) systems may be used to answer questions about images. For example, in response to the question "what is on top of the table?" a VQA system may generate the answer "an apple" or "an orange." However, the answers to some questions about images may involve information that is not present in the image. For example, with regards to a picture of cat food and the question "what animal would like to eat such a food?" a VQA system may not be able to answer the question without an external source of data as no animals may appear in the image itself.

The present disclosure relates generally to techniques for visual question answering. Specifically, the techniques described herein include an apparatus, method and system for visual question answering using visual knowledge memory networks. An example apparatus includes a receiver to receive an input image and a question. The apparatus includes an encoder to encode the input image and the question into a query representation including visual attention features. The apparatus further includes a knowledge spotter to retrieve a knowledge entry from a visual knowledge base pre-built on a set of question-answer pairs. The apparatus also includes a joint embedder to jointly embed the visual attention features and knowledge features to generate visual-knowledge features. The apparatus further includes an answer generator to generate an answer based on the query representation and the visual-knowledge features.

The techniques described herein thus enable automatic visual question answering. For example, the techniques described herein provide a system for automatic visual question answering based visual analytics applications including human robot interaction, aided driving, gaming and entertainment, etc. In particular, the techniques enable automatic answering of visual questions that include subject matter outside of the scope of an image. Moreover, the visual questions may be answered both accurately and efficiently.

Figure 1:
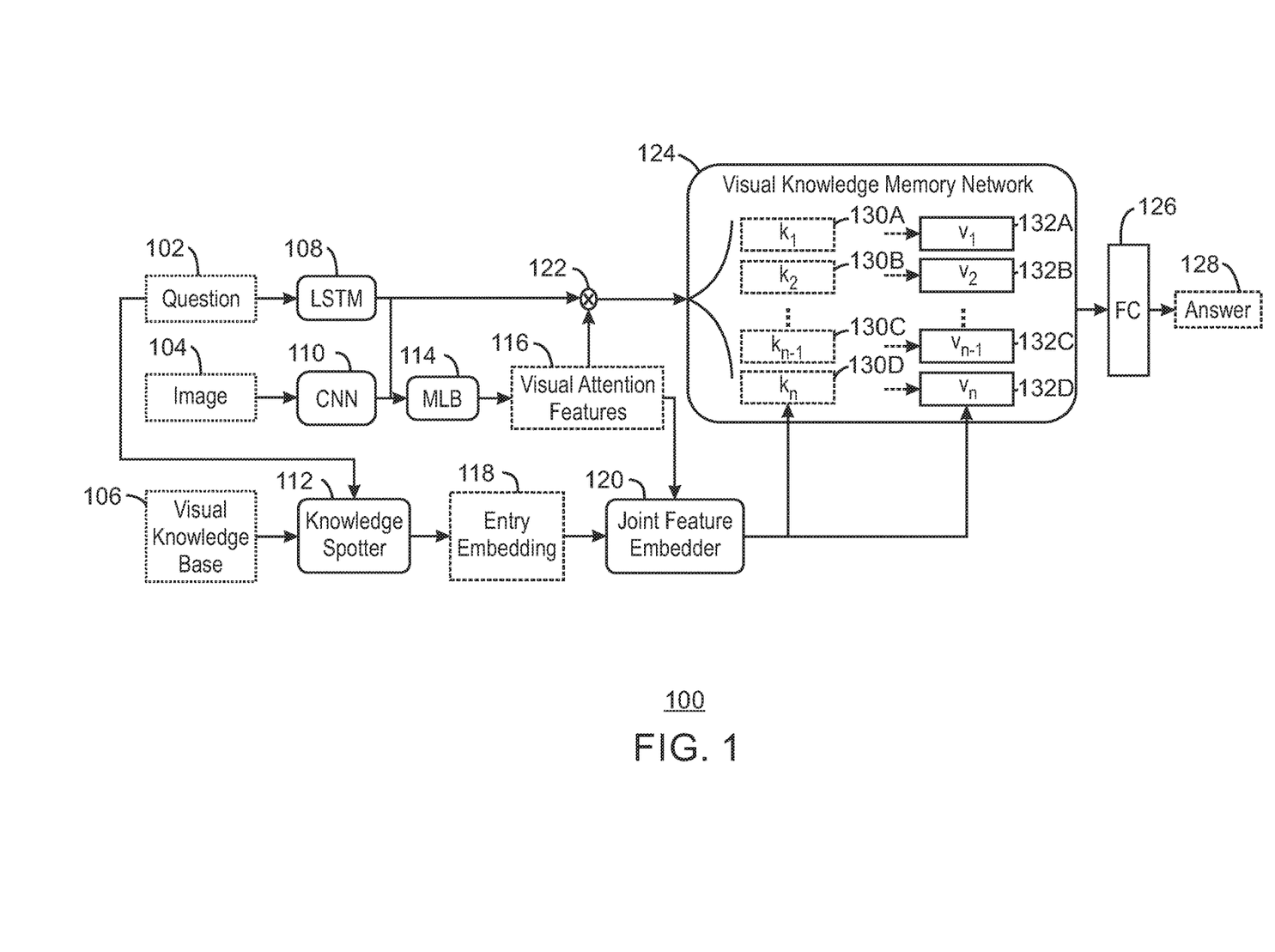
FIG. 1 is a block diagram illustrating an example system for visual question answering.

FIG. 1 is a block diagram illustrating an example system for visual question answering. The example system is referred to generally by the reference number 100 and can be implemented in the computing device 400 below in FIG. 4 using the method 300 of FIG. 3 below.

The example system 100 includes a question 102, an image 104, and a visual knowledge base 106. The system includes a long short-term memory network (LSTM) 108 shown receiving the question 102. The system also includes a convolutional neural network (CNN) 110 shown receiving the image 104. For example, the CNN 110 may be pretrained using any suitable object detection training set such as the image database organized according to the WordNet hierarchy known as ImageNet, last updated on Apr. 30, 2010.

The system 100 includes a knowledge spotter 112 shown receiving the question 102 and communicatively coupled to the visual knowledge base 106. The system 100 further includes a multimodal low-rank bilinear attention network (MLB) 114 that is communicatively coupled to the CNN 110. The MLB 114 is shown generating visual attention features 116. The knowledge spotter 112 is shown generating an entry embedding 118 that is in turn fed into a joint feature embedder 120 along with the visual attention features 116. The visual attention features 116 are also shown being fed along with output from the LSTM 108 into a combiner 122. For example, the combiner 122 can combine the output from the LSTM 108 and the visual attention features 116 to formulate a query to be sent to visual knowledge memory network (VKMN) 124. The joint feature embedder 120 and the combiner 122 are communicatively coupled to the VKMN 124. For example, the combiner 122 may send queries to the VKMN 124, while the joint feature embedder 120 can provide key records and value records for the VKMN 124. The VKMN 124 includes a number of keys 130A-130D and associated values 132A-132D. The VKMN 124 is communicatively coupled to a fully connected neural network (FC) 126. The FC 126 is shown outputting an answer 128.

As shown in FIG. 1, a question 102 about an image 104 may be answered using information from a visual knowledge base 106. In some examples, because the question 102 and the image 104 contain different types of information, namely pixels and an ordered set of words, the question 102 and the image 104 may be encoded into feature vectors using the LSTM 108 and CNN 110, respectively. For example, the LSTM 108 can generate a question vector and the CNN 110 can generate an image vector. For example, the image vector may include image embedding features, such as the output of the last layer of the CNN 110. In some examples, the feature vectors from the two modalities can be jointly embedded into a single visual attentive description for answer prediction. In some examples, any suitable method can be used to learn the multimodal joint embedding in an end-to-end manner for visual question answering (VQA). For example, multimodal compact bilinear pooling (MCB) and a multimodal low-rank bilinear attention network (MLB) 114 can be used. The MLB 114 can be used for visual-question pair encoding. For example, an LSTM encoded question vector represented herein as vector t, and MLB with spatial attention output represented herein as vector u, where u is already projected to the same dimensional space as t with some internal FC layers. Thus, $t, u \in \mathbb{R}^d$. In some examples, the unified representation of question vector t and spatial attention vector u with low-rank bilinear pooling may be represented using the equation:

$$q = t \cdot u \qquad \text{Eq. 1}$$

where "•" indicates the Hadamard product between two vectors, also known as an element-wise product, and q is the visual attentive description of the visual-question pair, also referred to herein as a query representation. For example, the query representation q may be the output of combiner 122 and spatial attention vector u may be from the visual attention features 116.

In some examples, because general purpose knowledge bases may contain a lot of knowledge entries that may be irrelevant to visual questions, a graph-based visual knowledge base 106 may be built for the purpose of VQA. For example, each entry in the visual knowledge base 106 may have a structure of <s, r, t>, where s and t are entities and r is a relation between the two entities s and t. The visual knowledge base may include two parts including knowledge entries extracted from the question-answer pairs in the VQA training dataset and knowledge triples from an image training set, such as the Visual Genome Relation dataset, version 1.4, released Jul. 12, 2017. The visual knowledge base 106 may be obtained by combining these two parts. For example, a visual knowledge base 106 generated based on the Visual Genome Relation dataset included about 159,970 unique knowledge triple facts.

In some examples, the knowledge spotter 112 can perform knowledge spotting by retrieving knowledge entries related to visual questions 102 from the visual knowledge base 106 using subgraph hashing. For example, given all knowledge triples $<s_i, r_i, t_i>$ in the pre-built visual knowledge base 106, an entity set $E = \{s_i, t_i\}$, and relation set $R = \{r_i\}$ can be generated. An entry set $S = E \cap R$ may contain all different entries in the visual knowledge base 106. In some examples, entries can be extracted whenever one phrase in questions 102 matches one item in the entry set S. For example, phrases from the questions 102 may be matched to one or more items in the entry set S using sub-graph hashing 112. In some examples, to avoid the ambiguity of visual knowledge, each knowledge triple may contain at least two entries extracted from the question 102. Afterwards, a small subset of n knowledge triples $\{<s_1, r_1, t_1>, <s_2, r_2, t_2>, \ldots <s_n, r_n, t_n>\}$ may then be created. In some examples, to handle long-tail effects in the visual knowledge base 106, the n knowledge triples may be expanded on the knowledge graph to include neighbors of those n knowledge triples. A memory network may then be setup to store m knowledge entries, where m>n. In some examples, if the size of the expanded knowledge subset is less than m, one or more null entries may be appended. For example, if m=8 and the subset only contains 5 entries, then 3 null entries may be appended to the subset.

The resulting entry embedding 118 may be sent to the joint feature embedder 120 to generate a joint feature embedding. For example, the joint feature embedder 120 may receive the spatial attentive visual feature vector u from an input module and knowledge entries e from the knowledge spotter 112. In some examples, the joint feature embedder 120 can learn a joint embedding of u and e. For example, because e is a one-hot text representation, the joint feature embedder 120 can impose a mapping function $\phi(\cdot)$ to obtain a real-valued feature vector $\phi(e) \in \mathbb{R}^{d_e}$. In some examples, $\phi(\cdot)$ may be either a bag-of-words (BoW) representation, a word2vec transformation, or a knowledge embedding, such as like TransE. In some examples, the joint feature embedder 120 can project u and $\phi(e)$ into the same space by applying low-rank bilinear pooling. For example, the low-rank bilinear pooling may be applied based on the equation:

$$x = \psi(e, u) = \sigma(W_e \phi(e) \cdot \sigma(W_u u)) \qquad \text{Eq. 2}$$

where $\psi(\cdot)$ is a hyperbolic tangent function, $W_e$ and $W_u$ are matrices projecting u and $\phi(e)$ into the same dimensional space, and x denotes the visual knowledge attentive description, which attends the visual feature u with knowledge entry e.

The VKMN 124 can store a number of key-value pairs in which keys 130A-130D are paired with values 132A-132D. For example, the memory slots of the BKMN 124 may be defined as key-value vector pairs like triples. For example, the key-value vector pairs may take the form: $\{<k_1, v_1>, <k_2, v_2>, \ldots <k_m, v_m>\}$. In some examples, the key is composed of the left-hand-side entity (subject) and relation, and the value is the right-hand side entity (object). In some examples, in order to answer different type of questions, the entry positions can also be reversed to obtain three combinations of keys and values: (s,r)–t, (s,t)–r, and (r,t)–s, as described in the example of FIG. 2 below. Such reordering may be useful to distinguish questions such as "what is the toothbrush used for?" and "what is used for brushing teeth?" For example, the example (s,r) may be the key item 130A, and t as the associated value item 132A. In some examples, Eq. 2 above can be used to obtain the embedding of keys and values. For example, given $e = (e_1, e_2, e_3)$, which corresponds to s,r,t separately, to ensure that key representation $k_i$, and value representation $v_i$, are of the same dimensionality, an additive assumption similar to continuous bag-of-words (CBOW) can be made, and the key and value may be derived using the equations:

$$k_i = \psi(e_1, u) + \psi(e_2, u) \qquad \text{Eq. 3}$$

$$v_i = \psi(e_3, u) \qquad \text{Eq. 4}$$

wherein $\psi(\cdot)$ is defined in Eq. 2 above.

With the key-value pairs containing keys 130A-130D and values 132A-132D stored in VKMN 124, the VKMN 124 may perform an inference to generate an answer 128. In some examples, the inference may include receiving a query representation, addressing related knowledge using a key, reading a corresponding value 132A-132D, and answering the question 102 represented by the query representation. For example, in key addressing, a processor can receive a query representation q, and address each candidate memory slot by assigning a relevance probability by comparing the question query representation q to each key. In some examples, the relevance probability can be calculated for each key using the equation:

$$p_i = \text{SoftMax}(q \cdot A k_i) \qquad \text{Eq. 5}$$

where • denotes an inner product and A is the parameter matrix for memory networks which projects $k_i$ into the same dimension as q.

The VKMN 124 can then perform value reading. In some examples, the VKMN 124 can read values of memory slot by taking a weighted average using the addressing possibilities, and output a return vector. For example, the return vector r may be is defined as:

$$o = \Sigma_i p_i v_i \qquad \text{Eq. 6}$$

In some examples, the VKMN 124 can update the query with q'=q+o, after receiving o.

The VKMN 124 can then answer the question represented by the query representation. For example, the question answering can be treated as a classification problem. In some examples, the VKMN 124 can predict the answer based on q' using a fully-connected layer (FC) 126 with weight matrix $W_o$ using the equation:

$$\hat{a} = \operatorname{argmax} \operatorname{SoftMax}(W_o q') \qquad \text{Eq. 7}$$

wherein all the parameters of matrix $W_u$, $W_e$, A, and $W_o$ in the VKMN 124 may be end-to-end trained with backpropagation using stochastic gradient descent. Thus, the FC 126 may receive a number of values from the VKMN 124 and output a single answer 128.

The diagram of FIG. 1 is not intended to indicate that the example system 100 is to include all of the components shown in FIG. 1. Rather, the example system 100 can be implemented using fewer or additional components not illustrated in FIG. 1 (e.g., additional questions, images, answers, models, networks, keys, values, answers, etc.).

Figure 2:
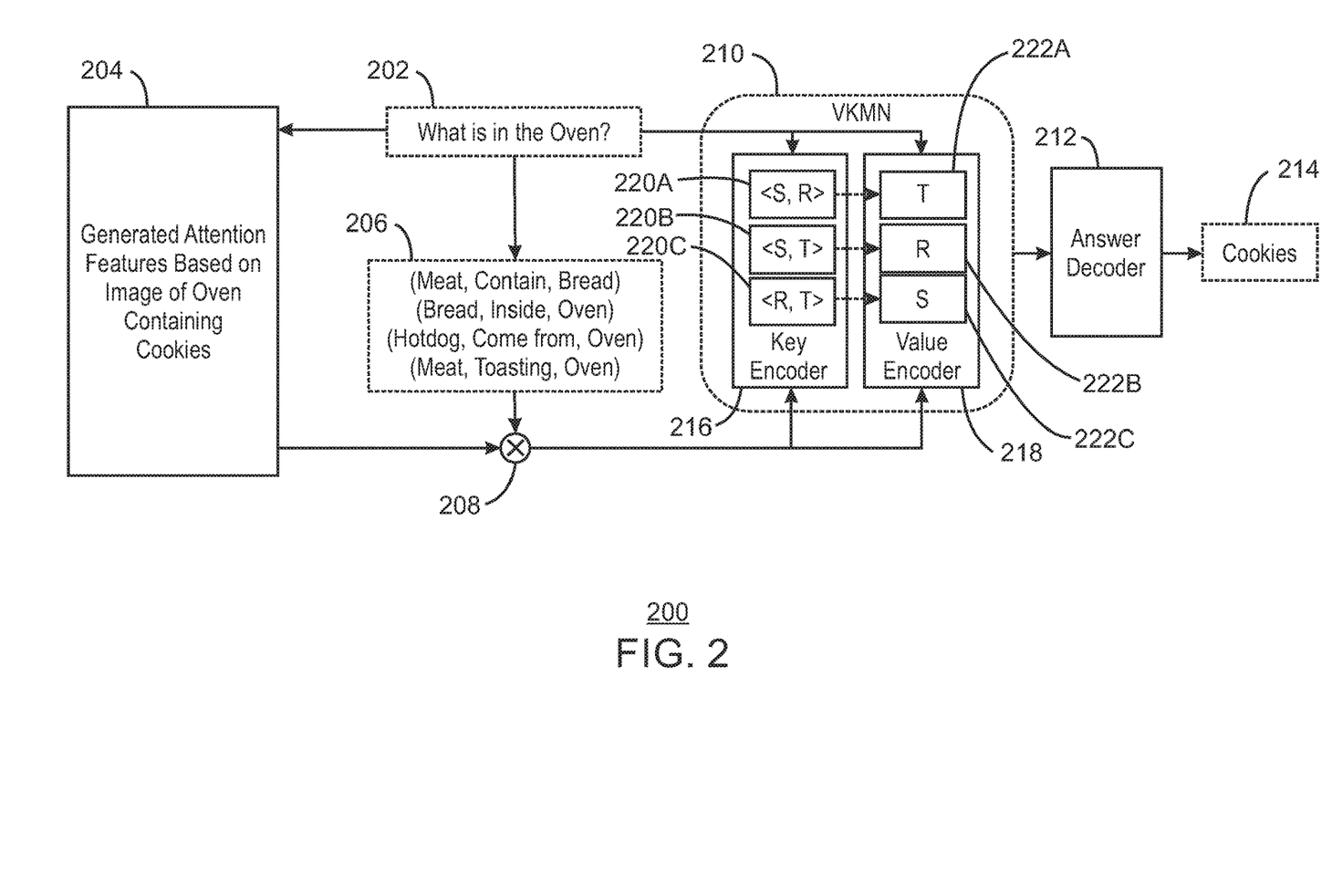
FIG. 2 is a flow chart illustrating an example visual memory knowledge network answering a visual question.

FIG. 2 is a diagram illustrating an example visual memory knowledge network system answering a visual question. The example system is generally referred to by the reference number 200 and can be implemented in the computing device 400 below. For example, the system 200 can be implemented using the VKMN 124 of the system 100 of FIG. 1, the VKMS 428 of the computing device 400 of FIG. 4 below, or the processor 502 of the computer readable media 500 of FIG. 5 below.

FIG. 2 shows an example received question 202 of "what is in the oven?" The example system 200 also includes a set of example generated visual attention features 204 based on an image of an oven containing cookies. The system 200 also includes a set of example extracted related knowledge, including "(Mean, Contain, Bread), (Bread, Inside, Oven), (Hotdog, Come from, Oven), and (Meat, Toasting, Oven)." The system 200 also includes a joint feature embedding 208. The system 200 also includes an example VKMN 210 communicatively coupled to an answer decoder 212. The VKMN 210 is shown receiving both a question query representation q corresponding to question 202 and the joint feature embedding 208. For example, the joint feature embedding 208 may include a knowledge triple e, which may be separated into keys and values and placed into the VKMN 210. The answer decoder 212 is shown outputting an example answer 214 of "cookies." The VKMN 210 includes a key encoder 216 and a value encoder 218. The key encoder 216 includes example keys 220A-220C. The value encoder 218 include example values 222A-222C.

As shown in FIG. 2, a question 202 and image may be received by the system 200 and an answer 214 generated. The system 200 can generate visual attention features 204 based on the question and the image and extract related knowledge 206 from the visual knowledge base 106. For example, the related knowledge 206 may be extracted from one or more visual knowledge bases, such as the visual knowledge 106 of FIG. 1 above. The generated visual attention features 204 extracted related knowledge 206 can then be jointly embedded to generate visual-knowledge features 208. The visual-knowledge features 208 may then be stored in the VKMN 210 as pairs of keys 220A-220C encoded by the key encoder 216 and corresponding values 222A-222C encoded by the value encoder 218. For simplicity, the examples VKMN 210 of FIG. 2 shows three memory blocks in both the key encoder 216 and the value encoder 218 representing the key-value pairs (s,r)–t, (s,t)–r, and (r,t)–s.

In some examples, the answer decoder 212 can then use the key-value pairs in the VKMN 210 to generate an answer to the received question 202. For example, in response to receiving a query representation corresponding to the question "what's in the oven?" the answer decoder may generate the answer "cookies" 214. For example, the answer decoder 212 may be a fully-connected layer trained with backpropagation using stochastic gradient descent.

The diagram of FIG. 2 is not intended to indicate that the example system 200 is to include all of the components shown in FIG. 2. Rather, the example system 200 can be implemented using fewer or additional components not illustrated in FIG. 2 (e.g., additional questions, answers, images, keys, values, answers, etc.).

Figure 3:
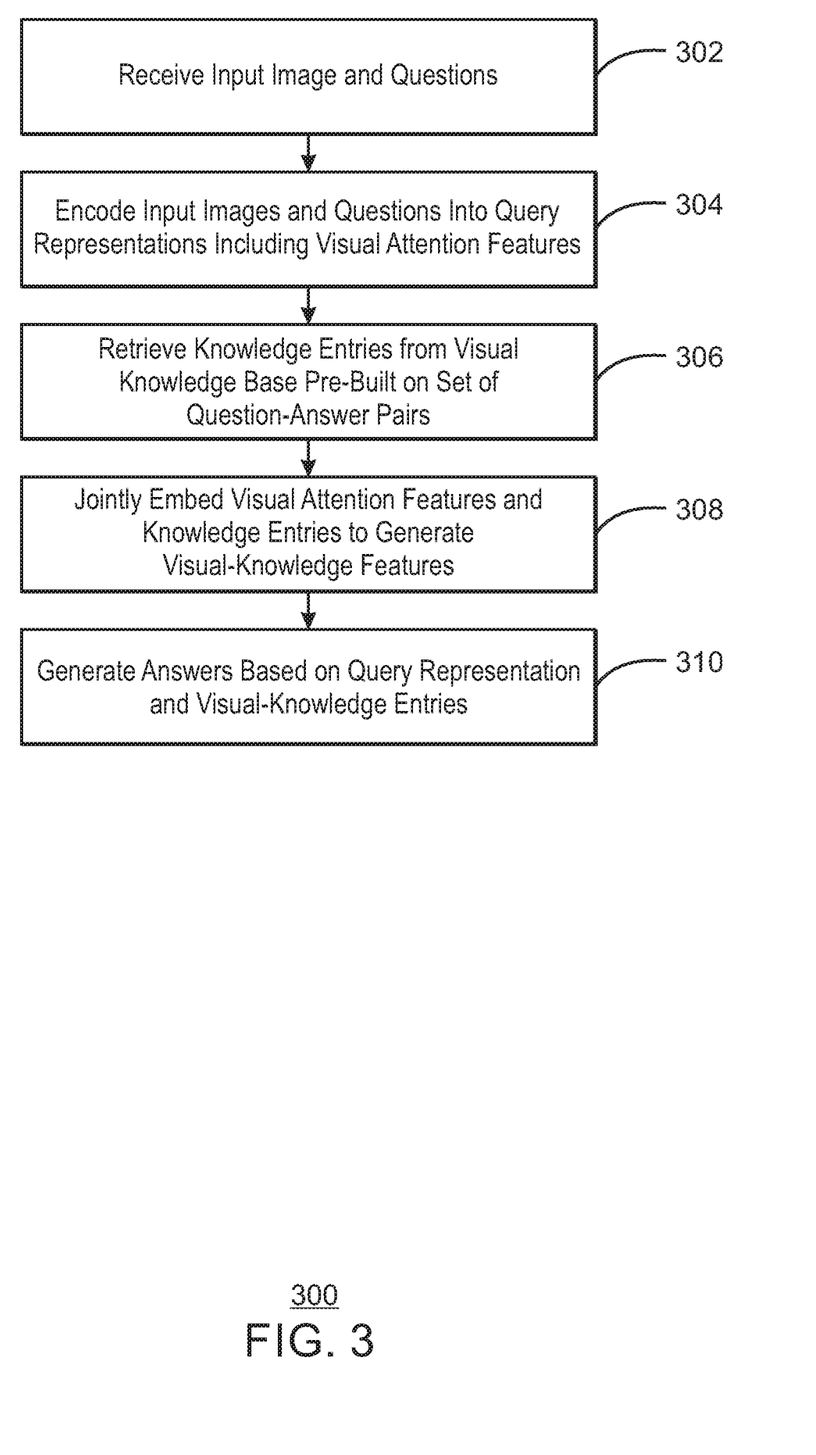
FIG. 3 is a flow chart illustrating a method for answering visual questions.

FIG. 3 is a flow chart illustrating a method for answering visual questions. The example method is generally referred to by the reference number 300 and can be implemented in the system 100 of FIG. 1 above, the processor 402 and visual knowledge memory network 428 of the computing device 400 of FIG. 4 below, or the computer readable media 500 of FIG. 5 below.

At block 302, the processor receives an input image and one or more questions. For example, the input image may include one or more objects related to the one or more questions.

At block 304, the processor encodes input images and questions into query representations including visual attention features. For example, the processor may generate visual attention features using a multimodal low-rank bilinear attention network (MLB). In some examples, the processor can encode the input images with a convolutional neural network (CNN) model and the questions with a long short-term memory (LSTM) model. For example, the processor can encode, via a convolutional neural network (CNN) model, the input image into an image vector including image embedding features. As one example, the processor can transfer the input image into a feature vector with a certain dimension. For example, the feature vector may have a dimension of 1024. The processor may also encode, via a long short-term memory (LSTM) model, the question into a question vector including question embedding features. In some examples, the processor can jointly embed the output of a convolutional neural network (CNN) model and a long short-term memory (LSTM) model to generate the query representation. In some examples, the processor can produce question relevant features from the output of a CNN model and an LSTM model using multimodal low-rank bilinear (MLB) pooling.

At block 306, the processor retrieves a knowledge entry from a visual knowledge base pre-built on a set of question-answer pairs. For example, the processor may retrieve the knowledge entry from the visual knowledge base using sub-graph hashing. In some examples, the visual knowledge base may be a graph-based knowledge base pre-built by extracting knowledge entries from question-answer pairs in a VQA dataset and knowledge triples from a visual dataset and combining the extracted knowledge entries from the VQA dataset and the extracted knowledge triples from the visual dataset into entries of the visual knowledge base of triple form having a structure of <s, r, t>.

At block 308, the processor jointly embeds the visual attention features and knowledge entries to generate visual-knowledge features. For example, the processor projects the visual attention feature u to the space of knowledge items k using Eq. 2 described above. In some examples, the processor can store the visual-knowledge features as key-value pairs in a visual knowledge memory network.

At block 310, the processor generates answers based on the query representations and the visual-knowledge entries. For example, the processor can read a key-value pair of a visual-knowledge features corresponding to the query representation and generate the answer based on the key-value pair. In some examples, the processor can send a plurality of values related to the query representation to a fully connected layer from a visual knowledge memory network and receive a single answer corresponding to a value with a higher score than other values in the plurality of values from the fully connected layer.

This process flow diagram is not intended to indicate that the blocks of the example process 300 are to be executed in any particular order, or that all of the blocks are to be included in every case. Further, any number of additional blocks not shown may be included within the example process 300, depending on the details of the specific implementation.

Figure 4:
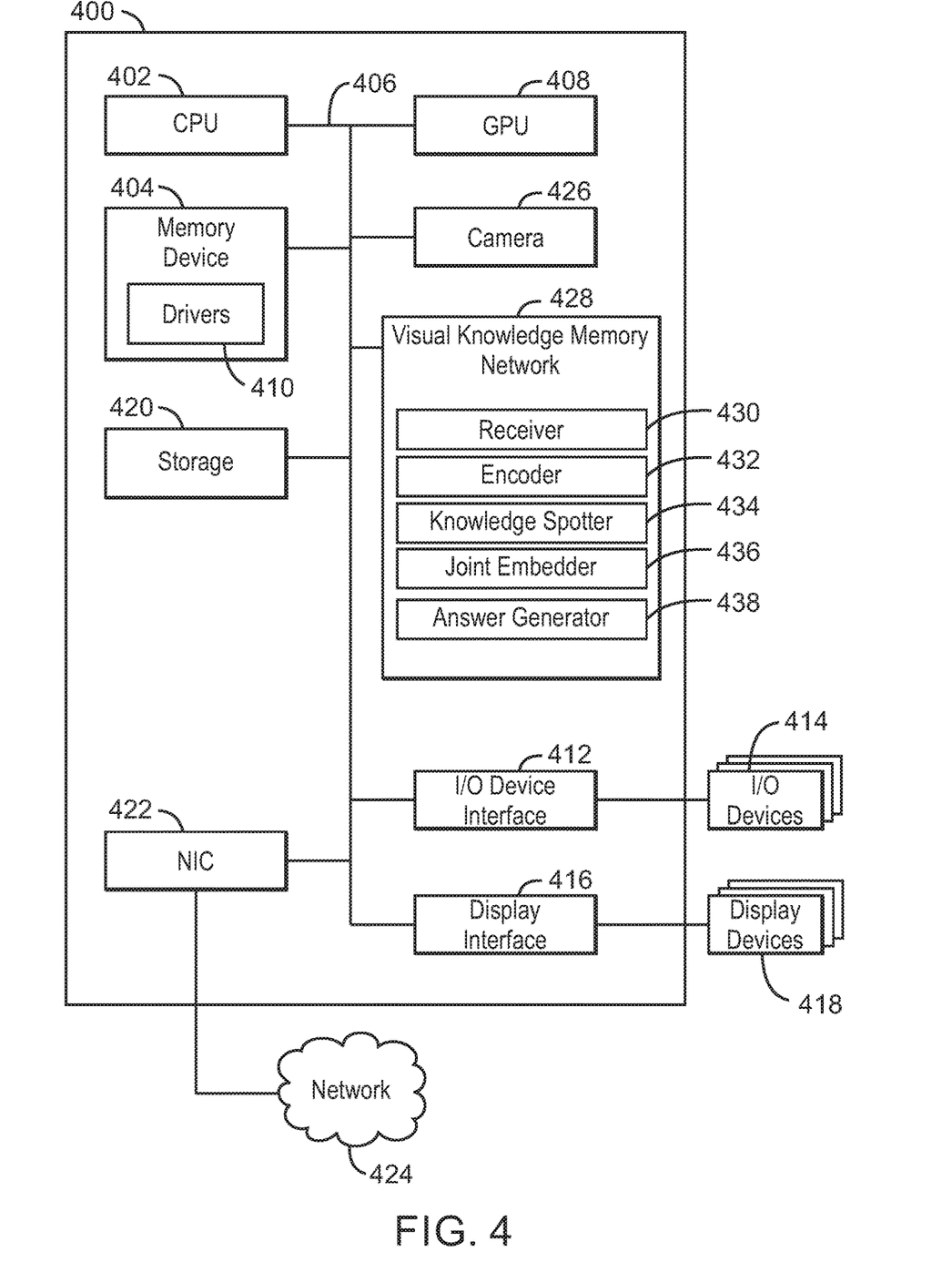
FIG. 4 is block diagram illustrating an example computing device that can answer visual questions.

Referring now to FIG. 4, a block diagram is shown illustrating an example computing device that can answer visual questions. The computing device 400 may be, for example, a laptop computer, desktop computer, tablet computer, mobile device, or wearable device, among others. In some examples, the computing device 400 may be a smart device such as a robotic device, a drone, or an assistant device, such as an assistant robot for the visually impaired. The computing device 400 may include a central processing unit (CPU) 402 that is configured to execute stored instructions, as well as a memory device 404 that stores instructions that are executable by the CPU 402. The CPU 402 may be coupled to the memory device 404 by a bus 406. Additionally, the CPU 402 can be a single core processor, a multi-core processor, a computing cluster, or any number of other configurations. Furthermore, the computing device 400 may include more than one CPU 402. In some examples, the CPU 402 may be a system-on-chip (SoC) with a multi-core processor architecture. In some examples, the CPU 402 can be a specialized digital signal processor (DSP) used for image processing. The memory device 404 can include random access memory (RAM), read only memory (ROM), flash memory, or any other suitable memory systems. For example, the memory device 404 may include dynamic random access memory (DRAM).

The memory device 404 can include random access memory (RAM), read only memory (ROM), flash memory, or any other suitable memory systems. For example, the memory device 404 may include dynamic random access memory (DRAM).

The computing device 400 may also include a graphics processing unit (GPU) 408. As shown, the CPU 402 may be coupled through the bus 406 to the GPU 408. The GPU 408 may be configured to perform any number of graphics operations within the computing device 400. For example, the GPU 408 may be configured to render or manipulate graphics images, graphics frames, videos, or the like, to be displayed to a user of the computing device 400.

The memory device 404 can include random access memory (RAM), read only memory (ROM), flash memory, or any other suitable memory systems. For example, the memory device 404 may include dynamic random access memory (DRAM). The memory device 404 may include device drivers 410 that are configured to execute the instructions for generating answers to visual questions. The device drivers 410 may be software, an application program, application code, or the like.

The CPU 402 may also be connected through the bus 406 to an input/output (I/O) device interface 412 configured to connect the computing device 400 to one or more I/O devices 414. The I/O devices 414 may include, for example, a keyboard and a pointing device, wherein the pointing device may include a touchpad or a touchscreen, among others. The I/O devices 414 may be built-in components of the computing device 400, or may be devices that are externally connected to the computing device 400. In some examples, the memory 404 may be communicatively coupled to I/O devices 414 through direct memory access (DMA).

The CPU 402 may also be linked through the bus 406 to a display interface 416 configured to connect the computing device 400 to a display device 418. The display device 418 may include a display screen that is a built-in component of the computing device 400. The display device 418 may also include a computer monitor, television, or projector, among others, that is internal to or externally connected to the computing device 400.

The computing device 400 also includes a storage device 420. The storage device 420 is a physical memory such as a hard drive, an optical drive, a thumbdrive, an array of drives, a solid-state drive, or any combinations thereof. The storage device 420 may also include remote storage drives.

The computing device 400 may also include a network interface controller (NIC) 422. The NIC 422 may be configured to connect the computing device 400 through the bus 406 to a network 424. The network 424 may be a wide area network (WAN), local area network (LAN), or the Internet, among others. In some examples, the device may communicate with other devices through a wireless technology. For example, the device may communicate with other devices via a wireless local area network connection. In some examples, the device may connect and communicate with other devices via Bluetooth® or similar technology. In some examples, the computing device 400 may receive questions or related images via the network 424.

The computing device 400 further includes a camera 426. For example, the camera may include one or more sensors. In some example, the camera may include a processor to generate images. For example, the images may be used to answer visual questions.

The computing device 400 further includes a visual knowledge memory network 428. For example, the visual knowledge memory network 428 can be used to generate answers to received questions about an image using a visual knowledge base. The visual knowledge memory network 428 can include a receiver 430, an encoder 432, a knowledge spotter 434, a joint embedder 436, and an answer generator 438. In some examples, each of the components 430-438 of the visual knowledge memory network 428 may be a microcontroller, embedded processor, or software module. The receiver 430 can receive an input image and a question. For example, the input image may include a number of objects related to the question. The encoder 432 can encode the input image and the question into a query representation including visual attention features. For example, the encoder 432 may include a convolutional neural network (CNN) model to be used to encode the input image into an image vector including image embedding features. In some examples, the encoder 432 may include a long short-term memory (LSTM) model to be used to encode the question into a question vector including question embedding features. In some examples, the encoder 432 can jointly embed the output of a convolutional neural network (CNN) model and a long short-term memory (LSTM) model to generate the query representation. In some examples, the encoder may include a multimodal low-rank bilinear attention network. The knowledge spotter 434 can retrieve a knowledge entry from a visual knowledge base based on the question. For example, the knowledge spotter 434 can retrieve the knowledge entry from the visual knowledge base using subgraph hashing. The joint embedder 436 can jointly embed the visual attention features and knowledge features to generate visual-knowledge features. For example, the knowledge features may include knowledge triples or subsets of knowledge triples. The answer generator 438 can generate an answer based on the query representation and the visual-knowledge features. For example, the answer generator 438 can include a visual knowledge memory network to store the visual-knowledge features as key-value pairs, receive the query representation, and output a plurality of values related to the query representation. In some examples, the answer generator 428 can generate the answer by reading a key-value pair of the visual-knowledge features corresponding to the query representation and generating the answer based on the key-value pair. In some examples, the answer generator 438 may include a fully connected neural network to receive a plurality of values related to the query representation from a visual knowledge memory network and output a single answer corresponding to a value with a higher score than other values in the plurality of values.

The block diagram of FIG. 4 is not intended to indicate that the computing device 400 is to include all of the components shown in FIG. 4. Rather, the computing device 400 can include fewer or additional components not illustrated in FIG. 4, such as additional buffers, additional processors, and the like. The computing device 400 may include any number of additional components not shown in FIG. 4, depending on the details of the specific implementation. Furthermore, any of the functionalities of the receiver 430, the encoder 432, the knowledge spotter 434, the joint embedder 436, and the answer generator 438, may be partially, or entirely, implemented in hardware and/or in the processor 402. For example, the functionality may be implemented with an application specific integrated circuit, in logic implemented in the processor 402, or in any other device. In addition, any of the functionalities of the CPU 402 may be partially, or entirely, implemented in hardware and/or in a processor. For example, the functionality of the visual knowledge memory network 428 may be implemented with an application specific integrated circuit, in logic implemented in a processor, in logic implemented in a specialized graphics processing unit such as the GPU 408, or in any other device.

Figure 5:
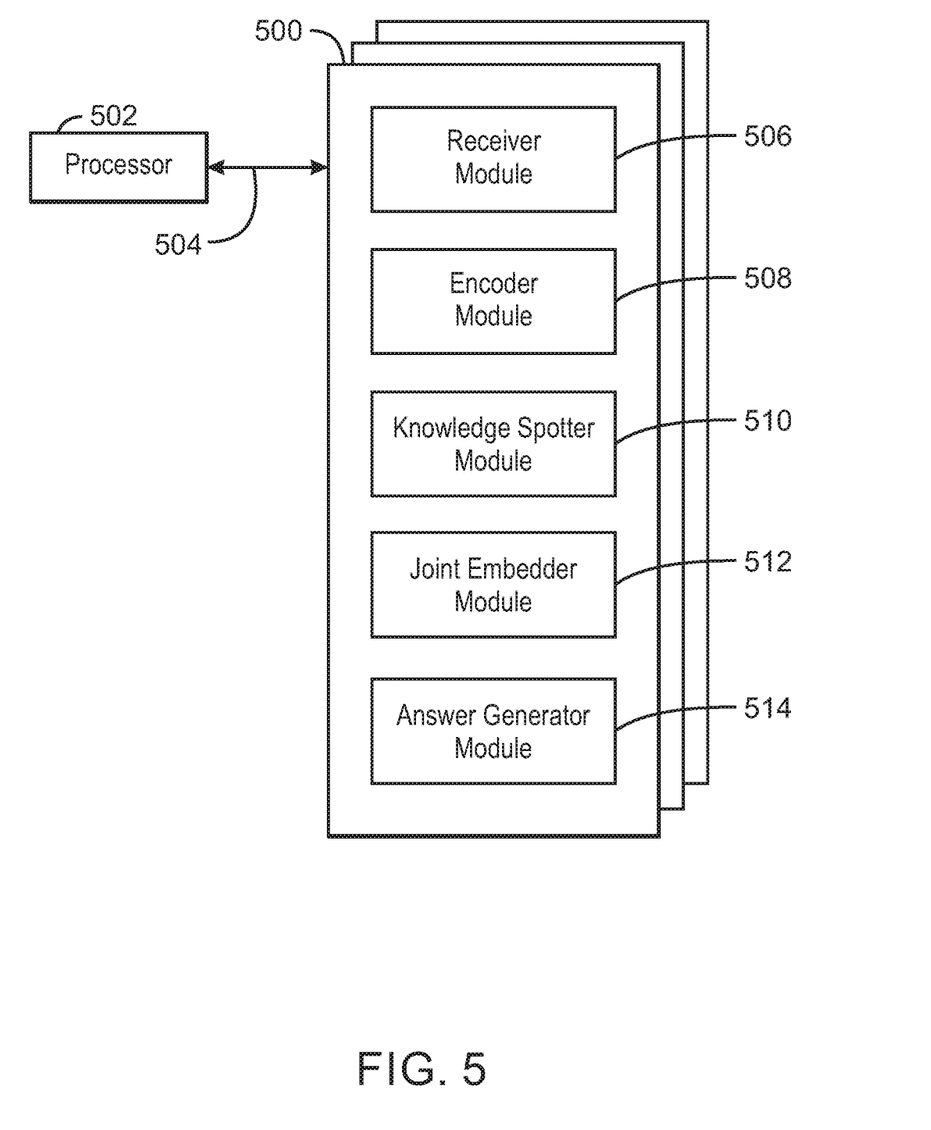
FIG. 5 is a block diagram showing computer readable media that store code for visual question answering.

FIG. 5 is a block diagram showing computer readable media 500 that store code for visual question answering. The computer readable media 500 may be accessed by a processor 502 over a computer bus 504. Furthermore, the computer readable medium 500 may include code configured to direct the processor 502 to perform the methods described herein. In some embodiments, the computer readable media 500 may be non-transitory computer readable media. In some examples, the computer readable media 500 may be storage media.

The various software components discussed herein may be stored on one or more computer readable media 500, as indicated in FIG. 5. For example, a receiver module 506 may be configured to receive an input image and a question. For example, the input image may include one or more objects related to the question. An encoder module 508 may be configured to encode the input image and the question into a query representation including visual attention features. In some examples, the encoder module 508 may be configured to use a multimodal low-rank bilinear attention network (MLB) to generate the visual attention features. In some examples, the encoder module 508 may be configured to jointly embed the output of a convolutional neural network (CNN) model and a long short-term memory (LSTM) model to generate the query representation. In some examples, the encoder module 508 may be configured to use multimodal low-rank bilinear pooling (MLB) to extract a visual attentive feature. For example, the visual attentive feature may be extracted from the output of a convolutional neural network (CNN) model and a long short-term memory (LSTM) model. A knowledge spotter module 510 may be configured to retrieve a knowledge entry from a visual knowledge base based on the question. For example, the knowledge spotter module 510 may be configured to retrieve the knowledge entry from the visual knowledge base using subgraph hashing. A joint embedder module 512 may be configured to jointly embed the visual attention features and knowledge features to generate visual-knowledge features. In some examples, the joint embedder module 512 may be configured to store the visual-knowledge features as key-value pairs in a visual knowledge memory network. An answer generator module 514 may be configured to generate an answer based on the query representation and the visual-knowledge features. For example, the answer generator module 514 may be configured to read a key-value pair of the visual-knowledge features corresponding to the query representation and generate the answer based on the key-value pair. For example, the answer generator module 514 may be configured to receive a plurality of values related to the query representation from a visual knowledge memory network and output a single answer corresponding to a value with a higher score than other values in the plurality of values.

The block diagram of FIG. 5 is not intended to indicate that the computer readable media 500 is to include all of the components shown in FIG. 5. Further, the computer readable media 500 may include any number of additional components not shown in FIG. 5, depending on the details of the specific implementation.

Examples

Example 1 is an apparatus for visual question answering. The apparatus includes a receiver to receive an input image and a question. The apparatus also includes an encoder to encode the input image and the question into a query representation including visual attention features. The apparatus further includes a knowledge spotter to retrieve a knowledge entry from a visual knowledge base pre-built on a set of question-answer pairs. The apparatus also further includes a joint embedder to jointly embed the visual attention features and the knowledge entry to generate visual-knowledge features. The apparatus also includes an answer generator to generate an answer based on the query representation and the visual-knowledge features.

Example 2 includes the apparatus of example 1, including or excluding optional features. In this example, the knowledge entry includes a knowledge triple or a subset of a knowledge triple.

Example 3 includes the apparatus of any one of examples 1 to 2, including or excluding optional features. In this example, the knowledge spotter is to retrieve the knowledge entry from the visual knowledge base using subgraph hashing.

Example 4 includes the apparatus of any one of examples 1 to 3, including or excluding optional features. In this example, the encoder includes a convolutional neural network (CNN) model to be used to encode the input image into an image vector including image embedding features.

Example 5 includes the apparatus of any one of examples 1 to 4, including or excluding optional features. In this example, the encoder includes a long short-term memory (LSTM) model to be used to encode the question into a question vector including question embedding features.

Example 6 includes the apparatus of any one of examples 1 to 5, including or excluding optional features. In this example, the encoder is to jointly embed the output of a convolutional neural network (CNN) model and a long short-term memory (LSTM) model to generate the query representation.

Example 7 includes the apparatus of any one of examples 1 to 6, including or excluding optional features. In this example, the encoder includes a multimodal low-rank bilinear attention network.

Example 8 includes the apparatus of any one of examples 1 to 7, including or excluding optional features. In this example, the answer generator includes a fully connected neural network to receive a plurality of values related to the query representation from a visual knowledge memory network and output a single answer corresponding to a value with a higher score than other values in the plurality of values.

Example 9 includes the apparatus of any one of examples 1 to 8, including or excluding optional features. In this example, the answer generator includes a visual knowledge memory network to store the visual-knowledge features as key-value pairs, receive the query representation, and output a plurality of values related to the query representation.

Example 10 includes the apparatus of any one of examples 1 to 9, including or excluding optional features. In this example, the answer generator is to generate the answer by reading a key-value pair of the visual-knowledge features corresponding to the query representation and generating the answer based on the key-value pair.

Example 11 is a method for answering visual questions. The method includes receiving, via a processor, an input image and a question. The method also includes encoding, via the processor, the input image and the question into a query representation including visual attention features. The method further includes retrieving, via the processor, a knowledge entry from a visual knowledge base pre-built on a set of question-answer pairs. The method also further includes jointly embedding, via the processor, the visual attention features and the knowledge entry to generate visual-knowledge features. The method also includes generating, via the processor, an answer based on the query representation and the visual-knowledge features.

Example 12 includes the method of example 11, including or excluding optional features. In this example, encoding the query representation includes encoding, via a convolutional neural network (CNN) model, the input image into an image vector including image embedding features.

Example 13 includes the method of any one of examples 11 to 12, including or excluding optional features. In this example, encoding the query representation includes encoding, via a long short-term memory (LSTM) model, the question into a question vector including question embedding features.

Example 14 includes the method of any one of examples 11 to 13, including or excluding optional features. In this example, encoding the query representation includes jointly embedding the output of a convolutional neural network (CNN) model and a long short-term memory (LSTM) model to generate the query representation.

Example 15 includes the method of any one of examples 11 to 14, including or excluding optional features. In this example, retrieving the knowledge entry includes using subgraph hashing.

Example 16 includes the method of any one of examples 11 to 15, including or excluding optional features. In this example, the method includes storing the visual-knowledge features as key-value pairs in a visual knowledge memory network.

Example 17 includes the method of any one of examples 11 to 16, including or excluding optional features. In this example, generating the answer includes reading a key-value pair of a visual-knowledge features corresponding to the query representation and generating the answer based on the key-value pair.

Example 18 includes the method of any one of examples 11 to 17, including or excluding optional features. In this example, generating the answer includes receive a plurality of values related to the query representation at a fully connected layer from a visual knowledge memory network and outputting a single answer corresponding to a value with a higher score than other values in the plurality of values.

Example 19 includes the method of any one of examples 11 to 18, including or excluding optional features. In this example, encoding the query representation includes using a multimodal low-rank bilinear attention (MLB) network to generate the visual attention features.

Example 20 includes the method of any one of examples 11 to 19, including or excluding optional features. In this example, encoding the query representation includes using multimodal low-rank bilinear (MLB) pooling to extract a visual attentive feature from output of a convolutional neural network (CNN) model and a long short-term memory (LSTM) model.

Example 21 is at least one computer readable medium for visual question answering having instructions stored therein that direct the processor to receive an input image and a question. The computer-readable medium also includes instructions that direct the processor to encode the input image and the question into a query representation including visual attention features. The computer-readable medium also further includes instructions that direct the processor to retrieve a knowledge entry from a visual knowledge base pre-built on a set of question-answer pairs. The computer-readable medium also includes instructions that direct the processor to jointly embed the visual attention features and knowledge entry to generate visual-knowledge features. The computer-readable medium also includes instructions that direct the processor to and generate an answer based on the query representation and the visual-knowledge features.

Example 22 includes the computer-readable medium of example 21, including or excluding optional features. In this example, the computer-readable medium includes instructions to retrieve the knowledge entry from the visual knowledge base using subgraph hashing.

Example 23 includes the computer-readable medium of any one of examples 21 to 22, including or excluding optional features. In this example, the computer-readable medium includes instructions to store the visual-knowledge features as key-value pairs in a visual knowledge memory network.

Example 24 includes the computer-readable medium of any one of examples 21 to 23, including or excluding optional features. In this example, the computer-readable medium includes instructions to use a multimodal low-rank bilinear attention network (MLB) to generate the visual attention features.

Example 25 includes the computer-readable medium of any one of examples 21 to 24, including or excluding optional features. In this example, the computer-readable medium includes instructions to jointly embed output of a convolutional neural network (CNN) model and a long short-term memory (LSTM) model to generate the query representation.

Example 26 includes the computer-readable medium of any one of examples 21 to 25, including or excluding optional features. In this example, the computer-readable medium includes instructions to store the visual-knowledge features as key-value pairs in a visual knowledge memory network.

Example 27 includes the computer-readable medium of any one of examples 21 to 26, including or excluding optional features. In this example, the computer-readable medium includes instructions to read a key-value pair of a visual-knowledge feature corresponding to the query representation and generating the answer based on the key-value pair.

Example 28 includes the computer-readable medium of any one of examples 21 to 27, including or excluding optional features. In this example, the computer-readable medium includes instructions to receive a plurality of values related to the query representation at a fully connected layer from a visual knowledge memory network and output a single answer corresponding to a value with a higher score than other values in the plurality of values.

Example 29 includes the computer-readable medium of any one of examples 21 to 28, including or excluding optional features. In this example, the computer-readable medium includes instructions to generate the visual attention features using a multimodal low-rank bilinear attention (MLB) network.

Example 30 includes the computer-readable medium of any one of examples 21 to 29, including or excluding optional features. In this example, the computer-readable medium includes instructions to extract a visual attentive feature from output of a convolutional neural network (CNN) model and a long short-term memory (LSTM) model using multimodal low-rank bilinear (MLB) pooling.

Example 31 is a system for visual question answering. The system includes a receiver to receive an input image and a question. The system includes an encoder to encode the input image and the question into a query representation including visual attention features. The system includes a knowledge spotter to retrieve a knowledge entry from a visual knowledge base pre-built on a set of question-answer pairs. The system includes a joint embedder to jointly embed the visual attention features and the knowledge entry to generate visual-knowledge features. The system includes an answer generator to generate an answer based on the query representation and the visual-knowledge features.

Example 32 includes the system of example 31, including or excluding optional features. In this example, the knowledge entry includes a knowledge triple or a subset of a knowledge triple.

Example 33 includes the system of any one of examples 31 to 32, including or excluding optional features. In this example, the knowledge spotter is to retrieve the knowledge entry from the visual knowledge base using subgraph hashing.

Example 34 includes the system of any one of examples 31 to 33, including or excluding optional features. In this example, the encoder includes a convolutional neural network (CNN) model to be used to encode the input image into an image vector including image embedding features.

Example 35 includes the system of any one of examples 31 to 34, including or excluding optional features. In this example, the encoder includes a long short-term memory (LSTM) model to be used to encode the question into a question vector including question embedding features.

Example 36 includes the system of any one of examples 31 to 35, including or excluding optional features. In this example, the encoder is to jointly embed the output of a convolutional neural network (CNN) model and a long short-term memory (LSTM) model to generate the query representation.

Example 37 includes the system of any one of examples 31 to 36, including or excluding optional features. In this example, the encoder includes a multimodal low-rank bilinear attention network.

Example 38 includes the system of any one of examples 31 to 37, including or excluding optional features. In this example, the answer generator includes a fully connected neural network to receive a plurality of values related to the query representation from a visual knowledge memory network and output a single answer corresponding to a value with a higher score than other values in the plurality of values.

Example 39 includes the system of any one of examples 31 to 38, including or excluding optional features. In this example, the answer generator includes a visual knowledge memory network to store the visual-knowledge features as key-value pairs, receive the query representation, and output a plurality of values related to the query representation.

Example 40 includes the system of any one of examples 31 to 39, including or excluding optional features. In this example, the answer generator is to generate the answer by reading a key-value pair of the visual-knowledge features corresponding to the query representation and generating the answer based on the key-value pair.

Example 41 is a system for visual question answering. The system includes means for receiving an input image and a question. The system also includes means for encoding the input image and the question into a query representation including visual attention features. The system also further includes means for retrieving a knowledge entry from a visual knowledge base pre-built on a set of question-answer pairs. The system also includes means for jointly embedding the visual attention features and the knowledge entry to generate visual-knowledge features. The system also further includes means for generating an answer based on the query representation and the visual-knowledge features.

Example 42 includes the system of example 41, including or excluding optional features. In this example, the knowledge entry includes a knowledge triple or a subset of a knowledge triple.

Example 43 includes the system of any one of examples 41 to 42, including or excluding optional features. In this example, the means for retrieving the knowledge entry is to retrieve the knowledge entry from the visual knowledge base using subgraph hashing.

Example 44 includes the system of any one of examples 41 to 43, including or excluding optional features. In this example, the means for encoding the input image and the question includes a convolutional neural network (CNN) model to be used to encode the input image into an image vector including image embedding features.

Example 45 includes the system of any one of examples 41 to 44, including or excluding optional features. In this example, the means for encoding the input image and the question includes a long short-term memory (LSTM) model to be used to encode the question into a question vector including question embedding features.

Example 46 includes the system of any one of examples 41 to 45, including or excluding optional features. In this example, the means for encoding the input image and the question is to jointly embed the output of a convolutional neural network (CNN) model and a long short-term memory (LSTM) model to generate the query representation.

Example 47 includes the system of any one of examples 41 to 46, including or excluding optional features. In this example, the means for encoding the input image and the question includes a multimodal low-rank bilinear attention network.

Example 48 includes the system of any one of examples 41 to 47, including or excluding optional features. In this example, the means for generating the answer includes a fully connected neural network to receive a plurality of values related to the query representation from a visual knowledge memory network and output a single answer corresponding to a value with a higher score than other values in the plurality of values.

Example 49 includes the system of any one of examples 41 to 48, including or excluding optional features. In this example, the means for generating the answer includes a visual knowledge memory network to store the visual-knowledge features as key-value pairs, receive the query representation, and output a plurality of values related to the query representation.

Example 50 includes the system of any one of examples 41 to 49, including or excluding optional features. In this example, the means for generating the answer is to generate the answer by reading a key-value pair of the visual-knowledge features corresponding to the query representation and generating the answer based on the key-value pair.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus for visual question answering, comprising:
   an encoder to:
      encode an input image into an image vector based on a first model;
      encode a question into a question vector based on a second model;
      generate a visual attention feature with a multimodal low-rank bilinear attention network based on the image vector and the question vector; and
      generate a query representation that includes the question vector and the visual attention feature;
   a knowledge spotter to retrieve a knowledge entry from a visual knowledge base based on the question, the visual knowledge base pre-built based on question-answer pairs;
   a joint embedder to jointly embed the visual attention feature and the knowledge entry to generate visual-knowledge features; and
   an answer generator to generate an answer based on the query representation and the visual-knowledge features.

2. The apparatus of claim 1, wherein the knowledge entry includes a knowledge triple or a subset of a knowledge triple.

3. The apparatus of claim 1, wherein the knowledge spotter is to retrieve the knowledge entry from the visual knowledge base using subgraph hashing.

4. The apparatus of claim 1, wherein the encoder includes a convolutional neural network (CNN) model as the first model to encode the input image into the image vector, the image vector to include image embedding features.

5. The apparatus of claim 1, wherein the encoder includes a long short-term memory (LSTM) model as the second model to encode the question into the question vector, the question vector to include question embedding features.

6. The apparatus of claim 1, wherein the encoder is to jointly embed the image vector from a convolutional neural network (CNN) model and the question vector from a long short-term memory (LSTM) model to generate the query representation.

7. The apparatus of claim 1, wherein the encoder includes the multimodal low-rank bilinear attention network.

8. The apparatus of claim 1, wherein the answer generator includes a fully connected neural network, the fully connected neural network to:

receive a plurality of values related to the query representation from a visual knowledge memory network; and output a single answer corresponding to a value with a higher score than other values in the plurality of values.

9. The apparatus of claim 1, wherein the answer generator includes a visual knowledge memory network, the visual knowledge memory network to:
store the visual-knowledge features as key-value pairs,
receive the query representation, and
output a plurality of values related to the query representation.

10. The apparatus of claim 1, wherein the answer generator is to generate the answer by reading a key-value pair of the visual-knowledge features corresponding to the query representation and generate the answer based on the key-value pair.

11. A method for answering visual questions, comprising:
encoding, by executing an instruction with a processor, an input image into an image vector using a first model and a question into a question vector using a second model;
generating, by executing an instruction with the processor, a visual attention feature using a multimodal low-rank bilinear attention network based on the image vector and the question vector;
generating, by executing an instruction with the processor, a query representation that includes the question vector and the visual attention feature;
retrieving, by executing an instruction with the processor, a knowledge entry from a visual knowledge base based on the question, the visual knowledge base pre-built based on question-answer pairs;
jointly embedding, by executing an instruction with the processor, the visual attention feature and the knowledge entry to generate visual-knowledge features; and
generating, by executing an instruction with the processor, an answer based on the query representation and the visual-knowledge features.

12. The method of claim 11, wherein the encoding of the input image into the image vector using the first model includes encoding the input image into the image vector via a convolutional neural network (CNN) model, the image vector to include image embedding features.

13. The method of claim 11, wherein the encoding of the question into the question vector using the second model includes encoding the question into the question vector via a long short-term memory (LSTM) model, the question vector to include question embedding features.

14. The method of claim 11, wherein the generating of the query representation includes jointly embedding the image vector from a convolutional neural network (CNN) model and the question vector from a long short-term memory (LSTM) model to generate the query representation.

15. The method of claim 11, wherein the retrieving of the knowledge entry includes using subgraph hashing.

16. The method of claim 11, further including storing the visual-knowledge features as key-value pairs in a visual knowledge memory network.

17. The method of claim 11, wherein the generating of the answer includes reading a key-value pair of the visual-knowledge features corresponding to the query representation and generating the answer based on the key-value pair.

18. The method of claim 11, wherein the generating of the answer includes receiving a plurality of values related to the query representation at a fully connected layer from a visual knowledge memory network and outputting a single answer corresponding to a value with a higher score than other values in the plurality of values.

19. The method of claim 11, further including using multimodal low-rank bilinear pooling to generate the visual attention feature.

20. The method of claim 11, further including using multimodal low-rank bilinear pooling to extract the visual attention feature from the image vector and the question vector, the image vector from a convolutional neural network (CNN) model and the question vector from a long short-term memory (LSTM) model.

21. At least one storage device comprising instructions that, in response to being executed on a computing device, cause the computing device to at least:
encode an input image into an image vector based on a first model;
encode a question into a question vector based on a second model;
generate a visual attention feature with a multimodal low-rank bilinear attention network based on the image vector and the question vector; and
generate a query representation that includes the question vector and the visual attention feature;
retrieve a knowledge entry from a visual knowledge base based on the question, the visual knowledge base pre-built based on question-answer pairs;
jointly embed the visual attention features and knowledge entry to generate visual-knowledge features; and
generate an answer based on the query representation and the visual-knowledge features.

22. The at least one storage device of claim 21, wherein the instructions are to cause the computing device to retrieve the knowledge entry from the visual knowledge base using subgraph hashing.

23. The at least one storage device of claim 21, wherein the instructions are to cause the computing device to store the visual-knowledge features as key-value pairs in a visual knowledge memory network.

24. The at least one storage device of claim 21, wherein the instructions are to cause the computing device to use multimodal low-rank bilinear pooling to generate the visual attention feature.

25. The at least one storage device of claim 21, wherein the instructions are to cause the computing device to jointly embed the image vector from a convolutional neural network (CNN) model and the question vector from a long short-term memory (LSTM) model to generate the query representation.

26. A system for visual question answering, the system comprising:
interface circuitry;
executable instructions; and
programmable circuitry to be programmed by the executable instructions to:
encode an input image into an image vector based on a first model;
encode a question into a question vector based on a long short-term memory (LSTM) model;
generate a visual attention feature with a multimodal low-rank bilinear attention network based on the image vector and the question vector; and
generate a query representation that includes the question vector and the visual attention feature;
access a knowledge entry from a visual knowledge base based on the question, the visual knowledge base pre-built based on question-answer pairs;

embed the visual attention feature and the knowledge entry to generate visual-knowledge features; and generate an answer based on the query representation and the visual-knowledge features.

27. The system of claim 26, wherein the programmable circuitry is to instantiate a convolutional neural network (CNN) model as the first model to encode the input image into the image vector, the image vector to include image embedding features.

28. The system of claim 26, wherein the programmable circuitry is to cause a fully connected neural network to:

receive a plurality of values related to the query representation from a visual knowledge memory network; and output a single answer corresponding to a value with a higher score than other values in the plurality of values.

29. The system of claim 26, wherein the programmable circuitry is to cause a visual knowledge memory network to:

store the visual-knowledge features as key-value pairs;

receive the query representation; and output a plurality of values related to the query representation.

30. The system of claim 26, wherein the programmable circuitry is to generate the answer by reading a key-value pair of the visual-knowledge features corresponding to the query representation and generate the answer based on the key-value pair.

* * * * *